United States Patent
Nakamura et al.

(10) Patent No.: US 8,955,222 B2
(45) Date of Patent: *Feb. 17, 2015

(54) COMBUSTOR CONNECTION STRUCTURE, COMBUSTOR TRANSITION PIECE, DESIGNING METHOD OF COMBUSTOR TRANSITION PIECE AND GAS TURBINE

(71) Applicant: Mitsubishi Heavy Industries, Ltd., Tokyo (JP)

(72) Inventors: Sosuke Nakamura, Hyogo-ken (JP); Satoshi Takiguchi, Hyogo-ken (JP); Norihiko Motoyama, Hyogo-ken (JP); Taiki Kinoshita, Hyogo-ken (JP); Yoshikazu Matsumura, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,883

(22) Filed: May 1, 2013

(65) Prior Publication Data

US 2014/0130511 A1 May 15, 2014

Related U.S. Application Data

(62) Division of application No. 12/674,352, filed as application No. PCT/JP2009/058068 on Apr. 23, 2009, now Pat. No. 8,448,451.

(30) Foreign Application Priority Data

Oct. 1, 2008 (JP) ................................. 2008-256531
Oct. 1, 2008 (JP) ................................. 2008-256532

(51) Int. Cl.
*B21D 53/00* (2006.01)
*F02C 3/04* (2006.01)
*F02C 1/00* (2006.01)
*F01D 9/02* (2006.01)
*F23R 3/46* (2006.01)
*F23R 3/60* (2006.01)

(52) U.S. Cl.
CPC ............ *F01D 9/023* (2013.01); *F05D 2250/50* (2013.01); *F23R 2900/00017* (2013.01); *Y02E 20/16* (2013.01); *F23R 3/46* (2013.01); *F23R 3/60* (2013.01)
USPC .............................. 29/890.02; 60/805; 60/752

(58) Field of Classification Search
USPC ............ 60/752–760; 29/890.01, 890.02, 890, 29/890.03
See application file for complete search history.

(56) References Cited

U.S. PATENT DOCUMENTS 6,546,627 B1 * 4/2003 Sekihara et al. ............. 29/889.1

* cited by examiner

*Primary Examiner* — Gerald L Sung
(74) *Attorney, Agent, or Firm* — Lowe Hauptman & Ham, LLP (57) ABSTRACT

A cross-sectional area (Dout) of a transition piece outlet is set within a range of 0.79£DoutDin£0.9, relative to a cross-sectional area (Din) of a transition piece inlet of a combustor, and in a first stage turbine nozzle of a turbine connected to the transition piece outlet, a size (Hin) in a radial direction between upstream ends of the inner shroud and the outer shroud has a same dimension as a size (a) in a radial direction of the transition piece outlet. In a combustor transition piece that is included in the combustor having a center line (S) arranged with an angle to an axial center (R) of a rotor of a gas turbine and that guides combustion gas to the turbine, a cross-sectional area is monotonously reduced from the transition piece inlet in which the combustion gas flows to the transition piece outlet from which the combustion gas flows out.

7 Claims, 7 Drawing Sheets

COMBUSTOR CONNECTION STRUCTURE, COMBUSTOR TRANSITION PIECE, DESIGNING METHOD OF COMBUSTOR TRANSITION PIECE AND GAS TURBINE

RELATED APPLICATIONS

The present application is a divisional of application Ser. No. 12/674,352, filed Feb. 19, 2010, which is based on International Application PCT/JP2009/058068 filed Apr. 23, 2009 which claims priority from Japanese Application Nos. 2008-256531 and 2008-256532 both filed Oct. 1, 2008, the disclosures of which are hereby incorporated by reference herein in their entirety

TECHNICAL FIELD

The present invention relates to a combustor connection structure in which the shape of a transition piece outlet of a combustor connected to a turbine is optimized, a combustor transition piece for optimizing the shape of the combustor transition piece in a turbine combustor, a designing method of such a combustor transition piece, and a gas turbine to which the combustor connection structure and the combustor transition piece are applied.

BACKGROUND ART

A gas turbine includes a compressor, a combustor and a turbine. The compressor generates high-temperature and high-pressure compressed air by compressing air taken in from an air inlet port. The combustor generates high-temperature and high-pressure combustion gas by supplying fuel to the compressed air and burning them. The turbine includes a casing having an exhaust passage in which a plurality of turbine nozzles and turbine rotor blades are alternately arranged. The combustion gas supplied to the exhaust passage is used to drive the turbine rotor blades, thereby, for example, rotatably driving a rotor connected to a generator. The combustion gas having driven the turbine is converted to static pressure by a diffuser provided downstream of the turbine and released to the atmosphere.

In recent years, combined cycles in which a steam generator and a steam turbine are combined and provided downstream of a gas turbine, for increasing the temperature of the gas turbine and improving the output and the efficiency, have been known. Some combined cycles extract steam from the steam turbine and cool a combustor in the gas turbine.

To improve the combined efficiency (heat efficiency) in such combined cycles, it is preferable to reduce the amount of heat exchange to cool at a transition piece outlet of the combustor connected to the turbine. In other words, the heat quantity for cooling the combustor is collected by steam having performed heat exchange, but if the heat quantity to be cooled can be reduced from the beginning, the combined efficiency is improved. If the flow velocity of the combustion gas is slowed by increasing the cross-sectional area of the transition piece outlet, the heat-transfer coefficient is also decreased, thereby reducing the amount of heat exchange. However, at a first stage turbine nozzle of a turbine that is connected to the transition piece outlet and that receives the combustion gas, the size of the first stage turbine nozzle in the radial direction provided downstream (outlet side) of the nozzle is aerodynamically determined. Accordingly, a problem arises when the cross-sectional area of the transition piece outlet is increased.

For example, Patent Document 1 discloses a gas turbine in which the size of an opening provided upstream of the nozzle in the radial direction is larger than that of the opening provided downstream.

In the above-described gas turbine, the combustion gas of the combustor is supplied to a turbine from the first stage turbine nozzle. A combustion gas passage is formed in a ring shape, because the first stage turbine nozzle is arranged along the circumference about the axial center of the rotor. A plurality of combustors is arranged along the circumference about the axial center of the rotor to supply combustion gas to the turbine. Ideally, the center line of each of the combustors is arranged in parallel with the axial center of the rotor, and the combustion gas is ejected straight to the turbine. However, due to structural constraints in the gas turbine casing, the center line of the combustor is obliquely arranged (at least 30 degrees) relative to the axial center of the rotor, so that the combustion gas is ejected obliquely from the outside in the radial direction to the inside in the radial direction. In the combustor, high-temperature and high-pressure combustion gas is produced by taking in compressed air, supplying fuel to the compressed air from a fuel nozzle, and burning them.

For example, as disclosed in Patent Document 2, the combustor includes a transition piece. The transition piece guides combustion gas ejected from the fuel nozzle to a transition piece outlet connected to the first stage turbine nozzle of the turbine from a transition piece inlet immediately after the fuel nozzle. The transition piece is formed to have a circular cross section of the transition piece inlet, and an arc cross section of the transition piece outlet with the ring-shaped combustion gas passage of the first stage turbine nozzle divided by the number of combustors to supply the combustion gas to the first stage turbine nozzle. In other words, the cross-sectional shape of the transition piece is changed from the transition piece inlet to the transition piece outlet. To stabilize the flow of the combustion gas, the transition piece needs to be contracted from the transition piece inlet to the transition piece outlet.

PRIOR ART DOCUMENTS

Patent Documents

Patent document 1: Japanese Patent Application Laid-open No. 2002-327602

Patent document 2: Japanese Patent Application Laid-open No. 2006-242559

DISCLOSURE OF INVENTION

Problem to be Solved by the Invention

The cross-sectional area of the transition piece outlet may be increased by employing the configuration of Patent Document 1, aerodynamically determining the size of the opening provided downstream of the first stage turbine nozzle in the radial direction, and increasing the size of the opening provided upstream thereof in the radial direction. However, simply enlarging the size of the first stage turbine nozzle in the radial direction on the upstream side increases the cooling area of the nozzle, thereby increasing the amount of cooling air. As a result, the combined efficiency may be reduced.

The reason why the increase of cooling air reduces the combined efficiency will now be described. In general, cooling air is obtained by bleeding air compressed by the compressor of the gas turbine, and sending it into the turbine. The compressor of the gas turbine is driven by a coaxial turbine, but the cooling air does not contribute to combustion, and therefore, does not contribute much to the work of the turbine. Accordingly, the increased cooling air results in additional consumption of the work of the turbine to drive the compressor accordingly, thereby lowering the output of the gas turbine. Because the temperature of the cooling air is lower than the temperature of the combustion gas, if the cooling air is increased, the temperature of the exhaust gas of the gas turbine is further lowered. As a result, the amount of the steam generated by the exhaust gas of the gas turbine is also reduced. Consequently, if the cooling air is increased, the combined efficiency is reduced.

The present invention has been made in view of the above circumstances, and intended to provide a combustor connection structure and a gas turbine that can improve the combined efficiency.

As described above, in the combined cycles, the combined efficiency can be improved if the heat quantity to be cooled is reduced from the beginning. Accordingly, it has been desired to reduce the amount of heat exchange by reducing the whole flow velocity at the wall surface in the transition piece of the combustor, preventing a local increase or decrease of the flow velocity, and reducing the heat-transfer coefficient.

The present invention has been made in view of the above circumstances, and intended to provide a combustor transition piece, a designing method of a combustor transition piece, and a gas turbine that can optimize the shape of the combustor transition piece and improve the combined efficiency.

Means for Solving Problem

According to an aspect of the present invention, in a combustor connection structure, where a cross-sectional area Dout of a transition piece outlet relative to a cross-sectional area Din of a transition piece inlet of a combustor is set within a range of $0.79 \leq Dout/Din \leq 0.9$, and a first stage turbine nozzle of a turbine is connected to the transition piece outlet, an upstream end of an inner shroud that forms an inner wall in a radial direction of the nozzle and an inner end in a radial direction of the transition piece outlet are arranged to contact each other in an axial direction of a rotor, an upstream end of an outer shroud that forms an outer wall in the radial direction of the nozzle and an inner end in a radial direction of the transition piece outlet are arranged to contact each other in the axial direction of the rotor, and a size in a radial direction between the upstream ends of the inner shroud and the outer shroud has a same dimension as a size in a radial direction of the transition piece outlet.

In the combustor connection structure, the flow velocity of the combustion gas at the wall surface is reduced in the transition piece of the combustor. Accordingly, the amount of heat exchange at a portion of the transition piece outlet is reduced, thereby improving the combined efficiency. In the turbine, because the flow-in velocity at the upstream side of the first stage turbine nozzle is reduced, the aerodynamic performance is improved, thereby improving the combined efficiency. In the turbine, because the blade height at the upstream end of the first stage turbine nozzle is increased, the amount of the cooling air to the blade portion is increased. However, because the flow velocity of the combustion gas at the wall surface is also reduced at the nozzle, the heat-transfer coefficient is reduced. Accordingly, the amount of the cooling air to the whole nozzles does not increase much. Further, the combined efficiency of the whole gas turbine is improved, because the increase of the amount of the cooling air is compensated by the improved aerodynamic performance in the turbine, and because the cross-sectional area of the transition piece outlet is determined within an optimal contraction ratio.

Advantageously, in the combustor connection, the inner shroud is arranged to be in parallel to a shaft center of rotor, and the outer shroud is arranged to be oblique to an axial center of the rotor.

In the combustor connection structure in which the center line of the combustor is obliquely arranged to the axial center, the flow velocity of the combustion gas from the transition piece to the nozzle does not increase nor decrease. Accordingly, it is possible to reduce the amount of heat exchange, thereby improving the combined efficiency.

According to another aspect of the present invention, in a combustor transition piece that is provided in a combustor having a center line arranged with an angle to an axial center of a rotor of a gas turbine and that guides combustion gas of the combustor to a turbine, a cross-sectional area is monotonously reduced from a transition piece inlet in which the combustion gas flows, to a transition piece outlet from which the combustion gas flows out.

In the combustor transition piece, the change in the cross-sectional area from the transition piece inlet to the transition piece outlet is optimized. The flow velocity at the wall surface from the transition piece inlet to the transition piece outlet reaches the peak at the transition piece outlet. Before reaching the transition piece outlet, the flow velocity is monotonously and stably changed while being suppressed so as not to exceed the peak. Accordingly, it is possible to improve the combined efficiency.

Advantageously, in the combustor transition piece, a cross-sectional area Dout of the transition piece outlet is set within a range of $0.79 \leq Dout/Din \leq 0.9$, relative to a cross-sectional area Din of the transition piece inlet.

In the combustor transition piece, the contraction ratio from the transition piece inlet to the transition piece outlet is optimized, and the flow velocity of the combustion gas at the wall surface is reduced. Accordingly, it is possible to reduce the amount of heat exchange at the portion of the transition piece outlet, thereby improving the combined efficiency.

According to still another aspect of the present invention, a designing method of a combustor transition piece includes: setting an angle of a center line of a combustor relative to an axial center of a rotor of a gas turbine; setting a contraction ratio from a transition piece inlet in which combustion gas flows to a transition piece outlet from which the combustion gas flows out; forming an inner outline in a radial direction, by extending a straight line in parallel with the center line from an inner end in a radial direction of the transition piece inlet to a downstream side, while maintaining a cross-sectional area of the transition piece inlet, extending a straight line in parallel with the axial center from an inner end in a radial direction of the transition piece outlet to an upstream side, and connecting the straight lines by an arc; forming an outer outline in the radial direction by smoothly connecting an outer end in a radial direction on a tubular downstream side where the cross-sectional area of the transition piece inlet is maintained, to an outer end in the radial direction of the transition piece inlet; and monotonously reducing a cross-sectional area from the tubular downstream side to the transition piece outlet, along the inner outline in the radial direction and the outer outline in the radial direction.

In the designing method of the combustor transition piece, it is possible to form a combustor transition piece in which the change in the cross-sectional shape from the transition piece inlet to the transition piece outlet and the shape including the contracting portion are optimized.

According to still another aspect of the present invention, a gas turbine that supplies combustion gas, obtained by supplying fuel to compressed air compressed by a compressor and burning the compressed air and the fuel in a combustor, to a turbine to generate rotational power, includes a combustor connection structure, where a cross-sectional area Dout of a transition piece outlet relative to a cross-sectional area Din of a transition piece inlet of a combustor is set within a range of $0.79 \leq \text{Dout/Din} \leq 0.9$, and a first stage turbine nozzle of a turbine is connected to the transition piece outlet. An upstream end of an inner shroud that forms an inner wall in a radial direction of the nozzle and an inner end in a radial direction of the transition piece outlet are arranged to contact each other in an axial direction of a rotor, an upstream end of an outer shroud that forms an outer wall in the radial direction of the nozzle and an inner end in a radial direction of the transition piece outlet are arranged to contact each other in the axial direction of the rotor, and a size in a radial direction between the upstream ends of the inner shroud and the outer shroud has a same dimension as a size in a radial direction of the transition piece outlet.

In the gas turbine, the flow velocity of the combustion gas at the wall surface is reduced in the transition piece of the combustor. Accordingly, the amount of heat exchange at the portion of the transition piece outlet can be reduced, thereby improving the combined efficiency. In the turbine, because the flow-in velocity at the upstream side of the first stage turbine nozzle is reduced, the aerodynamic performance can be improved, thereby improving the combined efficiency. In the turbine, the blade height at the upstream end of the first stage turbine nozzle is increased, thereby increasing the amount of the cooling air to the blade portion. However, because the flow velocity of the combustion gas at the wall surface is also reduced at the nozzle, the heat-transfer coefficient is reduced. Consequently, the amount of the cooling air to the whole nozzles does not increase much. Because the increase of the amount of the cooling air is compensated by the improved aerodynamic performance in the turbine, and because the cross-sectional area of the transition piece outlet is determined within an optimal contraction ratio, the combined efficiency of the whole gas turbine is improved. In the structure in which the center line of the combustor is obliquely arranged relative to the axial center, the flow velocity of the combustion gas from the transition piece to the nozzle does not increase nor decrease. Consequently, it is possible to reduce the amount of heat exchange, thereby improving the combined efficiency.

Advantageously, in the combustor connection structure of the gas turbine, the inner shroud is arranged to be in parallel to an axial center of the rotor, and the outer shroud is arranged to be oblique to the axial center of the rotor.

In the gas turbine, in the structure in which the center line of the combustor is obliquely arranged relative to the axial center, the flow velocity of the combustion gas from the transition piece to the nozzle does not increase nor decrease. Accordingly, it is possible to reduce the amount of heat exchange, thereby improving the combined efficiency.

According to still another aspect of the present invention, a gas turbine that supplies combustion gas, obtained by supplying fuel to compressed air compressed by a compressor and burning the compressed air and the fuel in a combustor, to a turbine to generate rotational power, includes: a combustor transition piece that is provided in the combustor having a center line arranged with an angle to an axial center of a rotor, and that has a cross-sectional area monotonously reduced from a transition piece inlet in which the combustion gas flows in to a transition piece outlet from which the combustion gas flows out, while the combustion gas is guided to the turbine.

In the gas turbine, the change in the cross-sectional area or the contraction ratio of the combustor transition piece from the transition piece inlet to the transition piece outlet is optimized. The flow velocity of the combustion gas at the wall surface is also reduced from the transition piece inlet to the transition piece outlet. Accordingly, the amount of heat exchange can be reduced, thereby improving the combined efficiency.

Advantageously, in the gas turbine, the combustor transition piece has a cross-sectional area Dout of the transition piece outlet set within a range of $0.79 \leq \text{Dout/Din} \leq 0.9$, relative to a cross-sectional area Din of the transition piece inlet.

In the gas turbine, the contraction ratio of the combustor transition piece from the transition piece inlet to the transition piece outlet is optimized, and the flow velocity of the combustion gas at the wall surface is reduced. Accordingly, it is possible to reduce the amount of heat exchange at the portion of the transition piece outlet, thereby improving the combined efficiency.

Effect of the Invention

In the present invention, the combined efficiency can be improved, because the flow velocity of the combustion gas at the wall surface is reduced by optimizing the shape of the transition piece outlet of the combustor connected to the turbine, and the amount of heat exchange at the portion of the transition piece outlet is reduced. In the present invention, the combined efficiency can be improved by optimizing the change in the cross-sectional shape and the contracting portion of the combustor transition piece from the transition piece inlet to the transition piece outlet.

BEST MODE(S) FOR CARRYING OUT THE INVENTION

Figure 1:
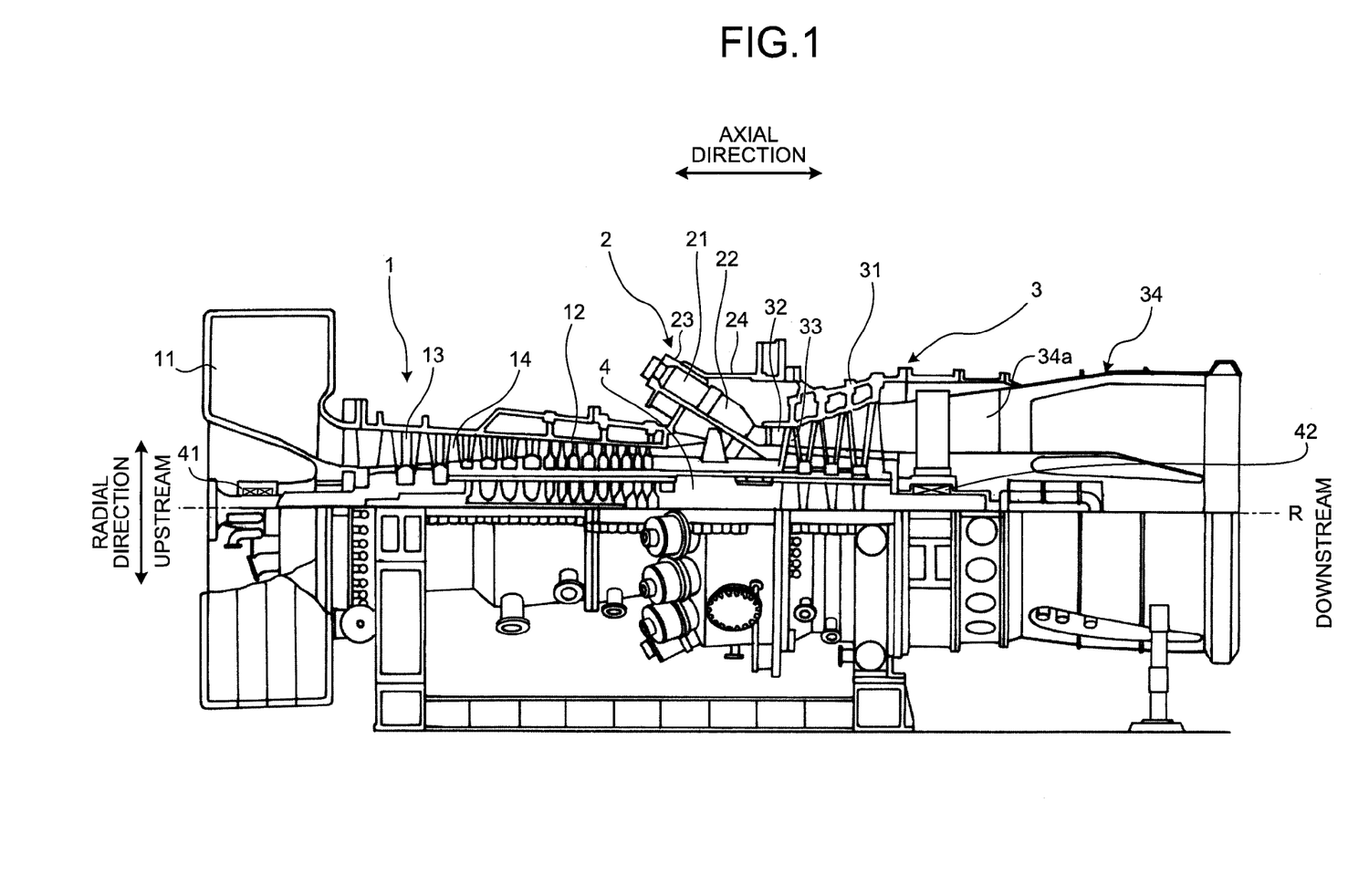
FIG. 1 is a schematic of a gas turbine according to an embodiment of the present invention.
Figure 2:
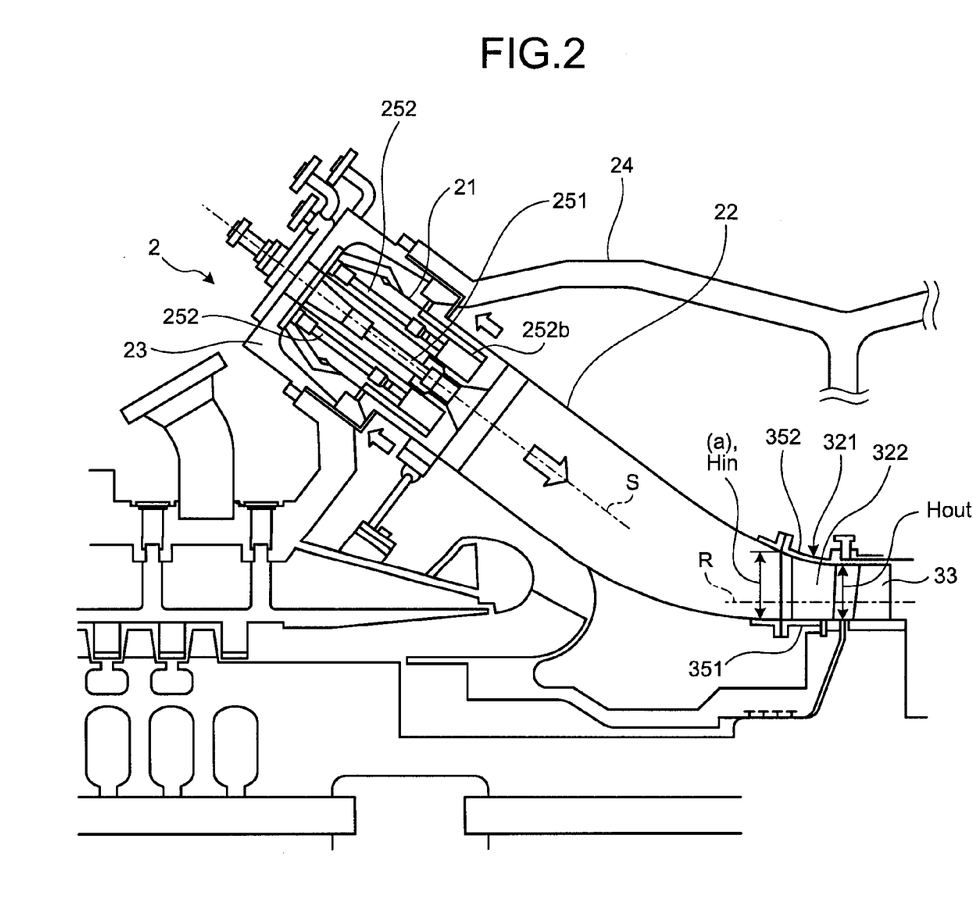
FIG. 2 is a schematic of a combustor of the gas turbine.
Figure 3:
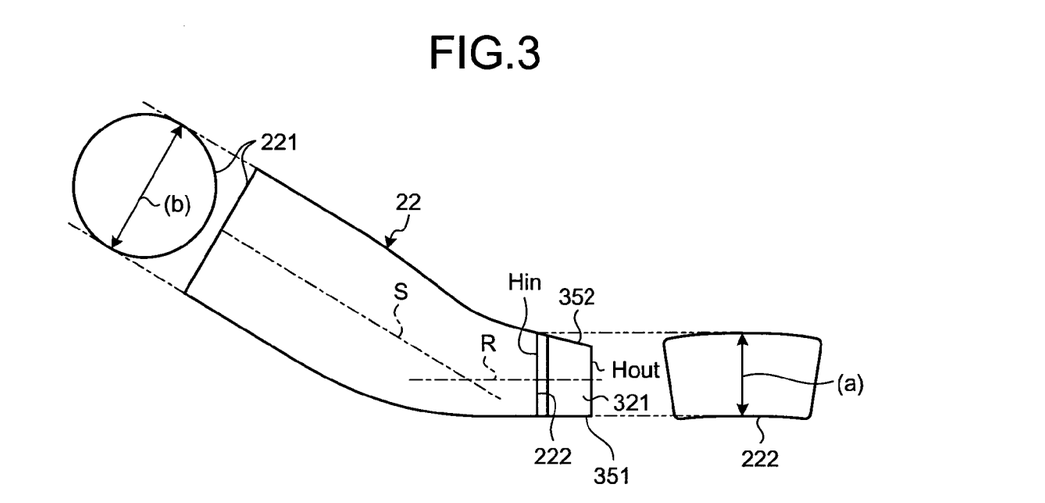
FIG. 3 is a schematic of an internal shape of a transition piece of the combustor.
Figure 4:
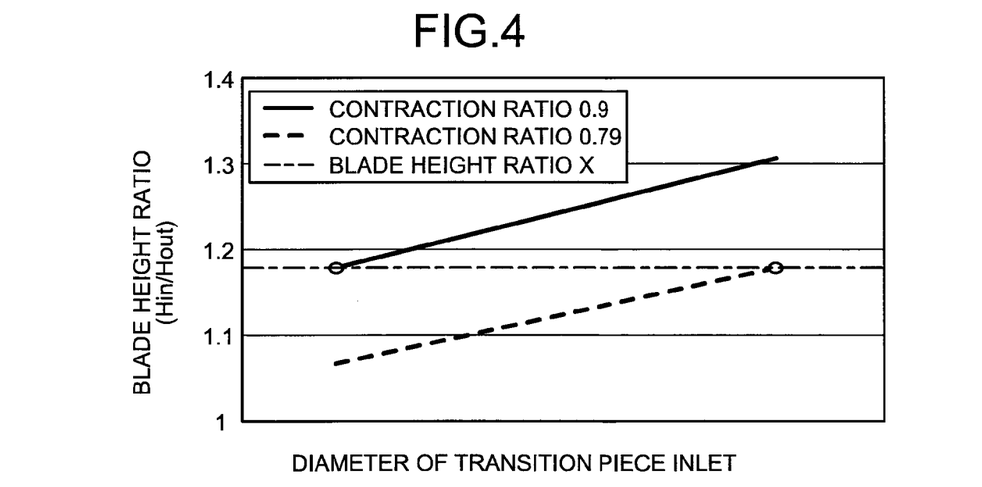
FIG. 4 is a schematic of a contraction ratio of the transition piece.

FIG. 1 is a schematic of a gas turbine according to an embodiment of the present invention. FIG. 2 is a schematic of a combustor of the gas turbine. FIG. 3 is a schematic of an internal shape of a transition piece of the combustor. FIG. 4 is a schematic of the contraction ratio of the transition piece.

A gas turbine, as shown in FIG. 1, includes a compressor 1, a combustor 2, and a turbine 3. A rotor 4 is arranged to penetrate through the center portions of the compressor 1, the combustor 2, and the turbine 3. The compressor 1, the combustor 2, and the turbine 3 are sequentially arranged side-by-side from the upstream to downstream of the flow of air or combustion gas, along a axial center R of the rotor 4. In the following explanation, the axial direction is a direction in parallel with the axial center R, the circumferential direction is a direction about the axial center R, and the radial direction is a direction perpendicular to the axial center R. The inside in the radial direction is the side close to the axial center R, and the outside in the radial direction is the side away from the axial center R.

The compressor 1 produces compressed air by compressing air. The compressor 1 includes a compressor casing 12 having an air inlet port 11 for taking in air, and a compressor vane 13 and a compressor rotor blade 14 are arranged in an air passage in the compressor casing 12. A plurality of compressor vanes 13 is fixed to the compressor casing 12 side, and arranged side-by-side in the circumferential direction. A plurality of compressor rotor blades 14 is fixed to the rotor 4 side, and arranged side-by-side in the circumferential direction. The compressor vanes 13 and the compressor rotor blades 14 are alternately arranged in the axial direction.

The combustor 2 generates high-temperature and high-pressure combustion gas, by supplying fuel to the compressed air compressed by the compressor 1. The combustor 2 includes an inner cylinder 21 in which compressed air and fuel are mixed and burned, a transition piece 22 that guides combustion gas to the turbine 3 from the inner cylinder 21, and an outer casing 23 that covers the outer periphery of the inner cylinder 21 and guides the compressed air to the inner cylinder 21 from the compressor 1. A plurality (16, for example) of combustors 2 is arranged side-by-side in a combustor casing 24 in the circumferential direction. In each of the combustors 2, due to structural constraints in the gas turbine casing, a center line S of the combustor 2 is obliquely arranged (at least by 30 degrees) to the axial center R of the rotor 4, so as to eject the combustion gas obliquely from the outside in the radial direction to the inside in the radial direction.

The combustor 2, as shown in FIG. 2, includes a fuel nozzles 251 and 252 for mainly supplying fuel. The fuel nozzle 251 is a pilot nozzle arranged in the center of the inner cylinder 21. The fuel nozzles 252 are a plurality (eight, for example) of main nozzles arranged adjacent to each other at the periphery of the pilot nozzle 251 in the inner cylinder 21 in the circumferential direction. A burner tube 252b that covers each of the main nozzles 252 is arranged at the periphery of the main nozzle 252.

In the combustor 2, as shown in FIG. 2, a flow of high-temperature and high-pressure compressed air flows into the outer casing 23, thereby allowing the compressed air to flow into the inner cylinder 21. In the inner cylinder 21, the compressed air is mixed with fuel injected from the main nozzles 252, becomes a swirl flow of fuel-air premix in the burner tube 252b, and flows into the transition piece 22. The compressed air is also mixed with fuel injected from the pilot nozzle 251, ignited by an ignition device, which is not shown, burned, and ejected into the transition piece 22 as combustion gas. At this time, flame holding for stabilizing the combustion of the fuel-air premix supplied from the burner tube 252b of each of the main nozzles 252, is carried out by a diffusion flame generated by the fuel injected from the pilot nozzle 251.

The turbine 3 produces rotational power from the combustion gas burned in the combustor 2. The turbine 3 has a turbine casing 31 to which combustion gas is supplied, and a turbine nozzle 32 and a turbine rotor blade 33 are arranged in an exhaust passage in the turbine casing 31. A plurality of turbine nozzles 32 is fixed to the turbine casing 31 side, and arranged side-by-side in the circumferential direction. A plurality of turbine rotor blades 33 is fixed to the outer periphery of a circular disk about the axial center R of the rotor 4, and arranged side-by-side in the circumferential direction. The turbine nozzles 32 and the turbine rotor blades 33 are alternately arranged in the axial direction. An exhaust chamber 34 including a diffuser portion 34a continuous to the turbine 3 is also provided downstream of the turbine casing 31.

An end of the rotor 4 at the side of the compressor 1 is supported by a bearing 41, and an end of the rotor 4 at the side of the exhaust chamber 34 is supported by a bearing 42. Accordingly, the rotor 4 is rotatably arranged about the axial center R. A driving shaft of a generator (not shown) is connected to the end of the rotor 4 at the side of the exhaust chamber 34.

In such a gas turbine, air taken in from the air inlet port 11 of the compressor 1 becomes high-temperature and high-pressure compressed air, by passing through the compressor vanes 13 and the compressor rotor blades 14, and being compressed. High-temperature and high-pressure combustion gas is generated by supplying fuel to the compressed air from the combustor 2. The combustion gas passes through the turbine nozzles 32 and the turbine rotor blades 33 of the turbine 3, thereby rotatably driving the rotor 4. Electric power is generated by providing rotational power to the generator connected to the rotor 4. The combustion gas having rotatably driven the rotor 4 is converted into static pressure by the diffuser portion 34a in the exhaust chamber 34 and released to the atmosphere.

In the gas turbine, as shown in FIGS. 2 and 3, the transition piece 22 of the combustor 2 is formed in a tubular shape, and a transition piece inlet 221 that is an opening at one side is connected to the inner cylinder 21, and a transition piece outlet 222 that is an opening at the other side is connected to a first stage turbine nozzle 321 that is an entrance to the exhaust passage of the turbine 3. The inner cylinder 21 connected to the transition piece inlet 221 is formed in a cylinder shape. Accordingly, the cross-sectional shape of the transition piece inlet 221 is formed in a circular shape (see FIG. 3). The first stage turbine nozzle 321 connected to the transition piece outlet 222 includes a blade portion 322, and an inner shroud 351 and an outer shroud 352 that support the blade portion 322, so as to sandwich the blade portion 322 in the radial direction. The inner shroud 351 is an inner wall of the first stage turbine nozzle 321 in the radial direction, and the outer shroud 352 is an outer wall of the first stage turbine nozzle 321 in the radial direction. A passage of the combustion gas is formed in a ring shape along the position of the first stage turbine nozzle 321 in the circumferential direction. As described above, the combustors 2 are arranged side-by-side in the circumferential direction. Accordingly, the cross-sectional shape of the transition piece outlet 222 is an arc with the ring shape corresponding to the first stage turbine nozzle 321 divided by the number of the combustors 2. In other words, the cross-sectional shape of the transition piece outlet 222 is a substantially quadrangle shape with an arc portion cut from a fan shape (see FIG. 3). That is, the cross-sectional shape of the transition piece 22 is changed from the transition piece inlet 221 to the transition piece outlet 222. The circumference of the ring shape of the first stage turbine nozzle 321 connected to the transition piece outlet 222 is already determined by the aerodynamic shape of the turbine 3. Consequently, the size of the arc cross section of the transition piece outlet 222 is determined by dividing the ring shape corresponding to the first stage turbine nozzle 321 by the number of the combustors 2.

In the first stage turbine nozzle 321, the size at the downstream side between the inner shroud 351 and the outer shroud 352 in the radial direction is determined by the aerodynamic shape of the turbine 3. In the present embodiment, a size Hout of an opening provided downstream of the first stage turbine nozzle 321 in the radial direction (blade height at the downstream) is the aerodynamically determined size, and a size Hin between upstream ends of the inner shroud 351 and the outer shroud 352 in the radial direction (blade height at the upstream) has a same dimension as a size (a) of the transition piece outlet 222 in the radial direction. Specifically, the inner shroud 351 is arranged in parallel (including manufacturing error) with the axial center R of the rotor, and the upstream end is arranged to contact with the inner end of the transition piece outlet 222 in the radial direction, in the axial direction of the rotor. The upstream end of the outer shroud 352 is placed to contact with the outer end of the transition piece outlet 222 in the radial direction, in the axial direction of the rotor, and the size Hin of the opening provided upstream in the radial direction (blade height at the upstream) is larger than the size Hout of the opening provided downstream in the radial direction (blade height at the downstream). Accordingly, the outer shroud 352 is obliquely arranged with respect to an axial center of the rotor R so that the opening provided downstream is gradually widened towards the opening provided upstream.

In the transition piece 22 of the combustor 2, a contracting portion is formed so that the cross-sectional area is reduced from the transition piece inlet 221 to the transition piece outlet 222 to stabilize the flow of combustion gas. More preferably, a contraction ratio Dout/Din of a cross-sectional area Dout of the transition piece outlet 222 relative to a cross-sectional area Din of the transition piece inlet 221 is 0.9. In other words, when the cross-sectional area of the transition piece inlet 221 (diameter (b)) is determined, the cross-sectional area (size (a) in the radial direction) of the transition piece outlet 222 is determined by the contraction ratio. As shown by the solid line in FIG. 4, a range of the diameter (b) of the transition piece inlet 221 is set, and a ratio of the size Hin of the opening provided upstream of the first stage turbine nozzle 321 between the upstream ends of the inner shroud 351 and the outer shroud 352 in the radial direction and the size Hout of the opening provided downstream of the first stage turbine nozzle 321 in the radial direction is set as a blade height ratio of Hin/Hout with its minimum value X being 1.18, relative to the size (a) of the cross-sectional area Dout of the transition piece outlet 222 in the radial direction of which the contraction ratio is 0.9. Then, as shown by the broken line in FIG. 4, while the minimum value of Hin/Hout of the first stage turbine nozzle 321 is X=1.18, the contraction ratio is 0.79 when the diameter (b) of the transition piece inlet 221 is maximized. Consequently, a preferable contraction ratio based on the minimum value X=1.18 of Hin/Hout of the first stage turbine nozzle 321 is a range within 0.79≤Dout/Din≤0.9, within a range of the diameter (b) of the transition piece inlet 221.

In the combustor connection structure and the gas turbine, in the combustor 2, the contraction ratio of the size (a) of the transition piece outlet 222 in the radial direction relative to the diameter (b) of the transition piece inlet 221 is optimized within the range of 0.79≤Dout/Din≤0.9. Accordingly, the flow velocity of the combustion gas at the wall surface is reduced, thereby reducing the amount of heat exchange at a portion of the transition piece outlet 222. Consequently, it is possible to improve the combined efficiency.

Because the flow-in velocity at the upstream side of the first stage turbine nozzle 321 is reduced, the aerodynamic performance of the turbine 3 is improved. Accordingly, it is possible to improve the combined efficiency. In the turbine 3, the blade height at the upstream side of the first stage turbine nozzle 321 (size Hin provided upstream of the first stage turbine nozzle 321 in the radial direction) is increased, thereby increasing the cooling area of the blade portion 322 of the first stage turbine nozzle 321. This results in increasing the cooling air and reducing the combined efficiency. However, because the flow velocity of the combustion gas at the wall surface is also reduced in the first stage turbine nozzle 321, thereby reducing the heat-transfer coefficient. Accordingly, the amount of the cooling air does not increase much in the whole first stage turbine nozzle 321. Because of the improved aerodynamic performance of the turbine 3, the reduced efficiency described above can be compensated, and because the cross-sectional area of the transition piece outlet 222 is determined within an optimal range of the contraction ratio, the combined efficiency of the whole gas turbine can be improved.

In the combustor connection structure and the gas turbine, in the first stage turbine nozzle 321 of the turbine 3, the inner shroud 351 is arranged in parallel with the axial center R of the rotor 4, and the upstream end portion of the inner shroud 351 is arranged to contact with the inner end of the transition piece outlet 222 in the radial direction, in the axial direction of the rotor. The upstream end portion of the outer shroud 352 is obliquely arranged with respect to the axial center R of the rotor (4) so as to contact with the outer end of the transition piece outlet 222 in the radial direction, in the axial direction of the rotor. Accordingly, as shown in FIG. 2, in the structure in which the center line S of the combustor 2 is obliquely arranged to the axial center R, the flow velocity of the combustion gas to the first stage turbine nozzle 321 from the transition piece 22 does not increase nor decrease. Accordingly, the amount of heat exchange can be reduced, thereby improving the combined efficiency.

These will be described with reference to FIGS. 5 to 8. FIG. 6 is a schematic of a relationship between the ratio of the size Hin between upstream ends of the inner shroud 351 and the outer shroud 352 in the radial direction and the size Hout of the opening provided downstream in the radial direction (blade height ratio of Hin/Hout) of the first stage turbine nozzle 321, and the turbine efficiency. As shown in FIG. 6, the turbine efficiency is improved with the increase of Hin/Hout ratio.

Figure 7:
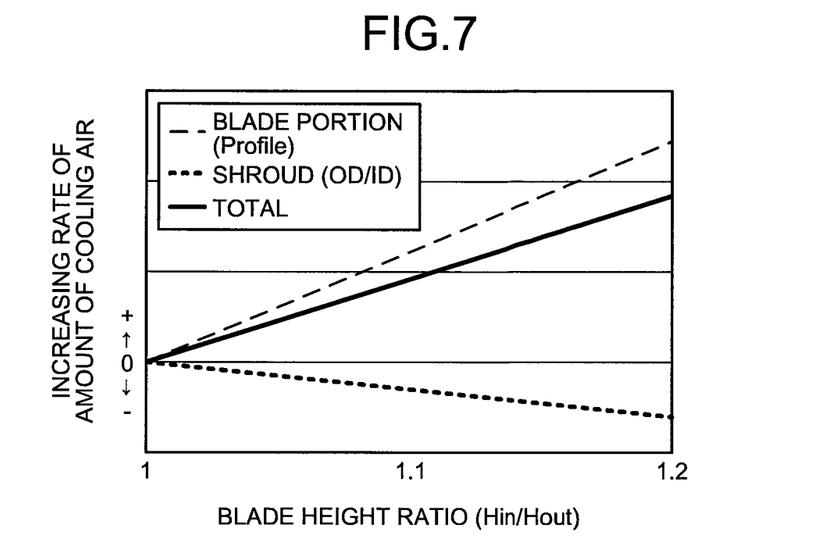
FIG. 7 is a schematic of an increasing rate of cooling air to a first stage turbine nozzle relative to the blade height ratio of Hin/Hout.

FIG. 7 is a schematic of a relationship between the blade height ratio of Hin/Hout and the increasing rate of the amount of the cooling air to the first stage turbine nozzle 321. In the diagram, the thin broken line is the amount of the cooling air to the blade portion, the bold broken line is the amount of the cooling air to the shroud portion, and the bold solid line is the total amount of the cooling air. As shown in FIG. 7, with the increase of Hin/Hout ratio, the cooling area of the blade portion is increased, thereby increasing the amount of cooling air. However, because the flow velocity of the combustion gas at the wall surface is reduced, the heat-transfer coefficient is also reduced, thereby reducing the amount of the cooling air to the shroud. Accordingly, the total amount of the cooling air does not increase much.

Figure 5:
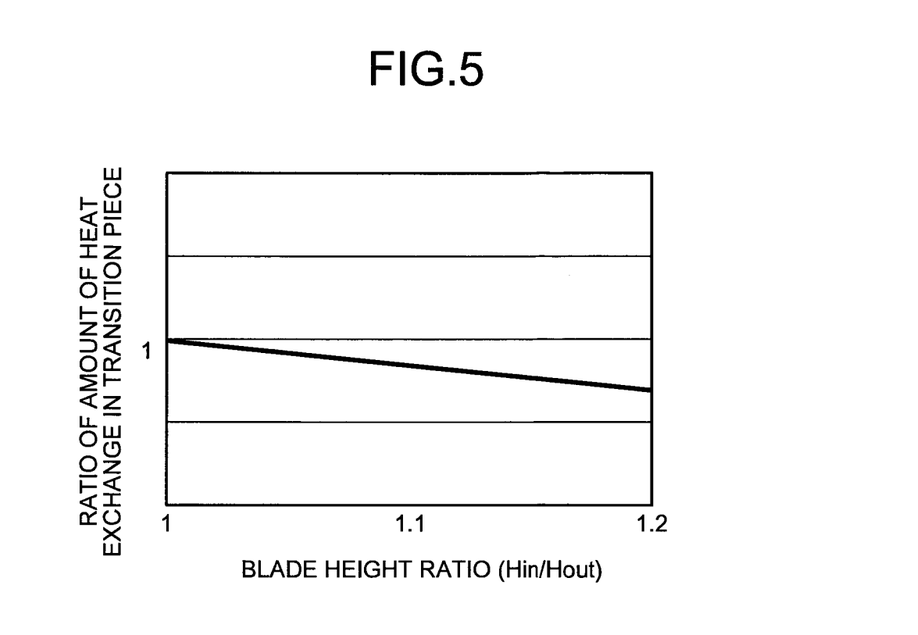
FIG. 5 is a schematic of an amount of heat exchange in the combustor transition piece relative to a blade height ratio of Hin/Hout.
Figure 6:
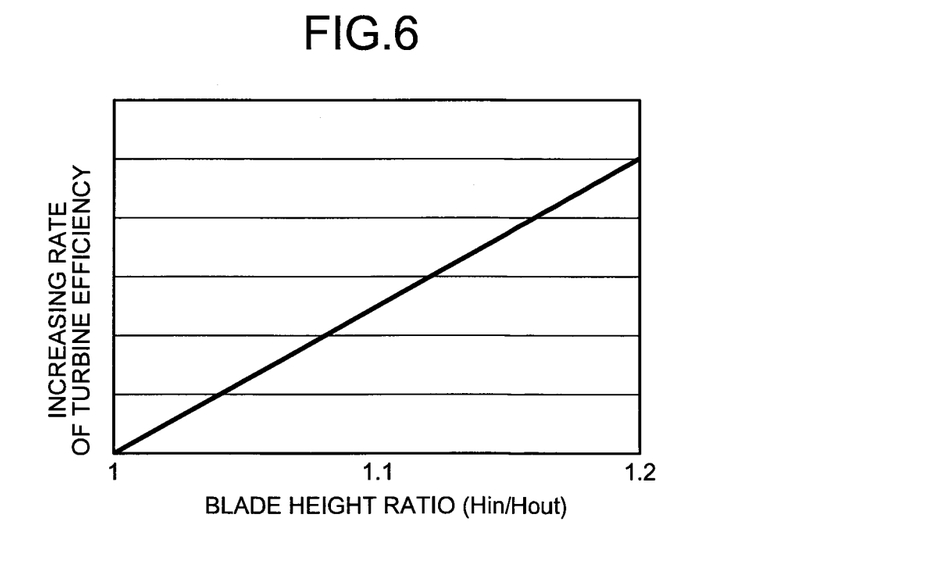
FIG. 6 is a schematic of an increasing rate of turbine efficiency relative to the blade height ratio of Hin/Hout.

FIG. 5 is a schematic of a ratio of the amount of heat exchange in a combustor transition piece relative to the blade height ratio of Hin/Hout. As shown in FIG. 5, when the outer shroud is not obliquely arranged with respect to the axial center R of the rotor (4), in other words, based on Hin/Hout=1, the amount of heat exchange is reduced with the increase of Hin/Hout ratio.

Figure 8:
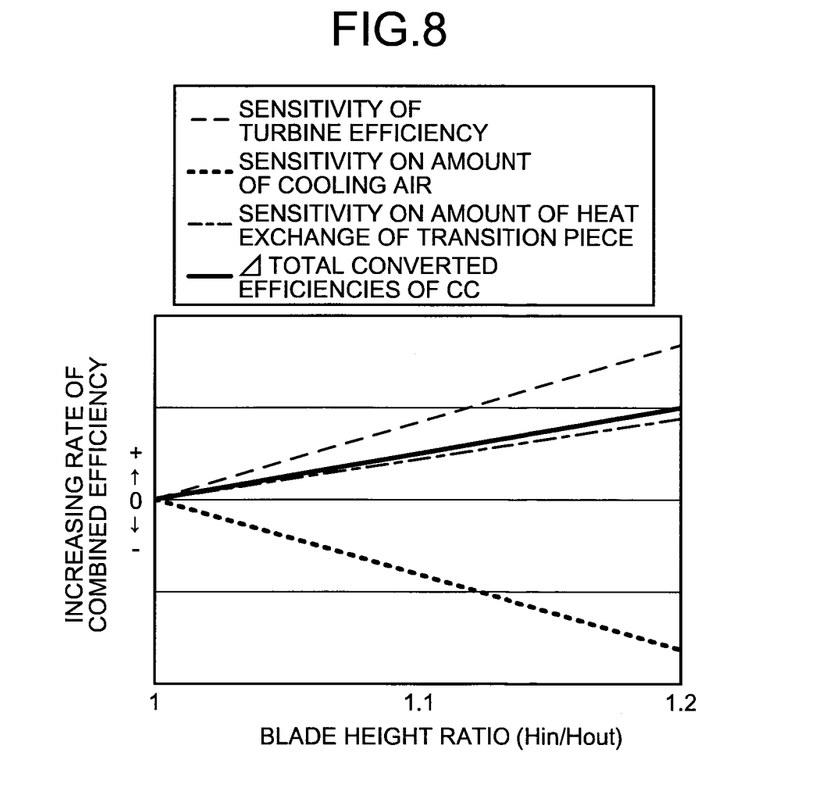
FIG. 8 is a schematic of an increasing rate of a combined efficiency relative to the blade height ratio of Hin/Hout.

FIG. 8 is a schematic of a relationship between the blade height ratio of Hin/Hout and an increased amount of the combined efficiency. In the diagram, the thin broken line is the sensitivity of the turbine efficiency, the bold broken line is the sensitivity on the amount of the cooling air of the turbine nozzle, and the thin dashed-dotted line is the sensitivity on the amount of heat exchange of the combustor transition piece. As shown in FIG. 8, when the blade height ratio is increased, the amount of the cooling air is increased, thereby reducing the combined efficiency. However, because the turbine efficiency is improved, the amount of heat exchange in the combustor transition piece is reduced, thereby improving the combined efficiency as a whole.

Figure 9:
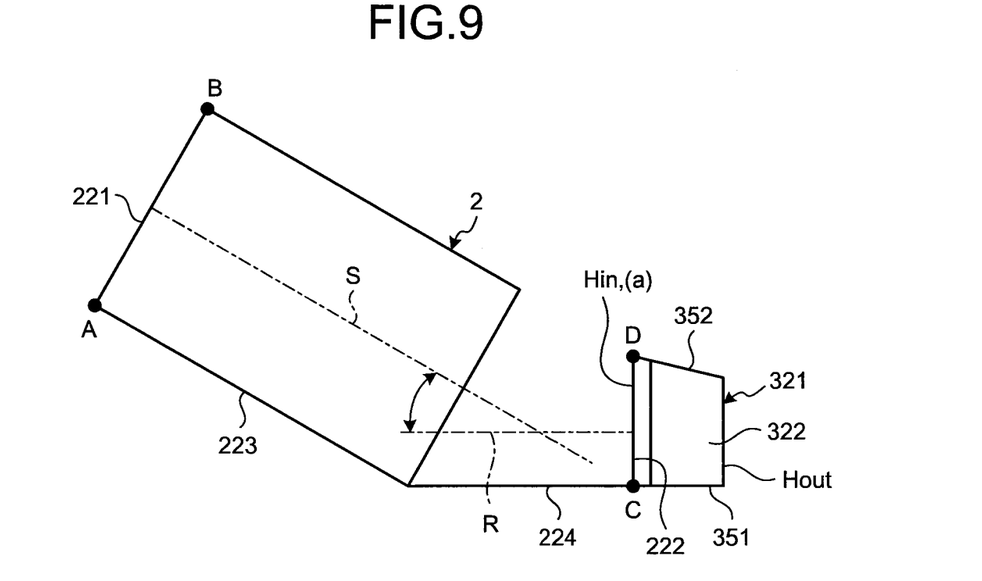
FIG. 9 is a conceptual schematic of a designing method of the combustor transition piece.
Figure 10:
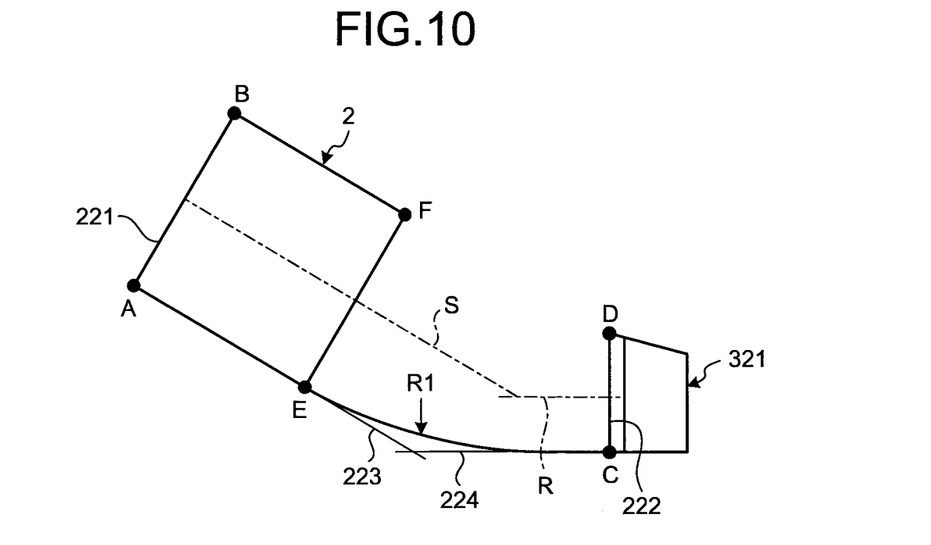
FIG. 10 is a conceptual schematic of the designing method of the combustor transition piece.
Figure 11:
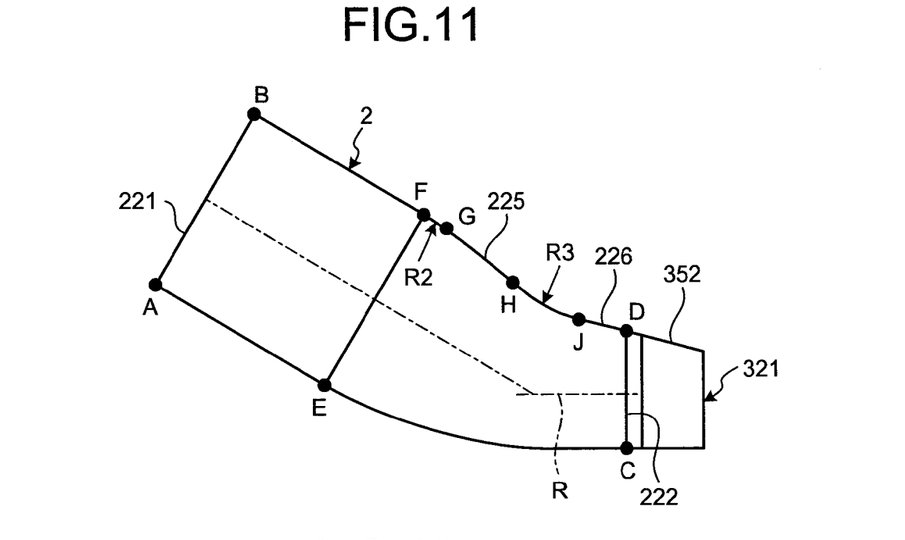
FIG. 11 is a conceptual schematic of the designing method of the combustor transition piece.
Figure 12:
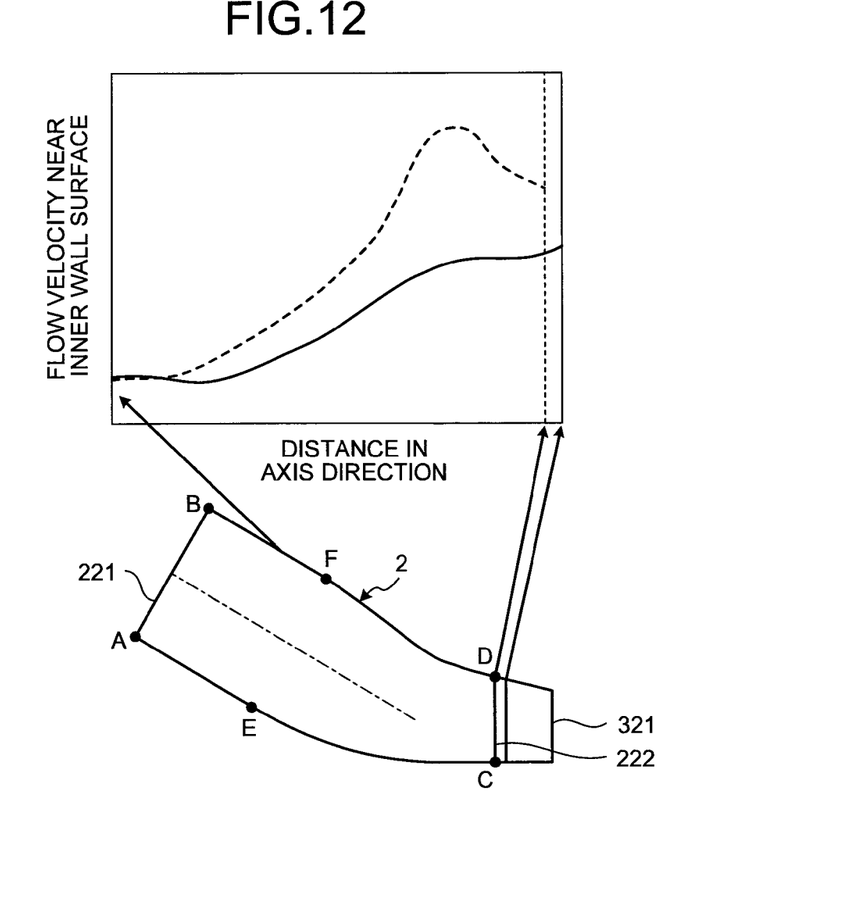
FIG. 12 is a schematic of a flow velocity near an inner wall surface of the combustor transition piece.

FIGS. 9 to 11 are conceptual schematics of a designing method of the transition piece. FIG. 12 is a schematic of a flow velocity near the inner wall surface of the transition piece. Internal shapes of the transition piece 22 are shown in FIGS. 9 to 12.

In the designing method of the transition piece 22, as shown in FIG. 9, the angle of the center line S of the combustor 2 is set to the axial center R of the rotor 4 in the gas turbine. The angle of the center line S to the axial center R is set to 30 degrees. The axial center R shown in FIG. 9 is a reference line in parallel with the axial center R. The diameter of the transition piece inlet 221 of the combustor 2 is set in advance within the above-described predetermined range. Accordingly, an inner end A in the radial direction and an outer end B in the radial direction of the transition piece inlet 221 are determined.

The cross-sectional area Dout of the transition piece outlet 222 is set within the range of $0.79 \leq Dout/Din \leq 0.9$, relative to the cross-sectional area Din of the transition piece inlet 221. The contraction ratio is more preferably set to Dout/Din=0.9. The size of the arc transition piece outlet 222 is already obtained by dividing the ring shape corresponding to the first stage turbine nozzle 321 by the number of the combustors 2. Accordingly, when the cross-sectional area Dout is determined, the size in the radial direction is also determined. An inner end C of the transition piece outlet 222 in the radial direction is placed at a location in parallel with the axial center R, to the inner wall (inner shroud 351) of the first stage turbine nozzle 321 in the radial direction. Consequently, an outer end D of the transition piece outlet 222 in the radial direction is determined. To maximize the retention time of the combustion gas in the transition piece 22, in other words, to maximize the internal volume of the transition piece 22, the cylinder-shaped portion from the transition piece inlet 221 is maximized, and the length of the contracting portion is shortened as much as possible. Accordingly, as shown in FIG. 9, a first virtual straight line 223 in parallel with the center line S is extended from the inner end A of the transition piece inlet 221 in the radial direction towards the downstream side. A second virtual straight line 224 in parallel with the axial center R is extended from the inner end C of the transition piece outlet 222 in the radial direction towards the upstream side. As described above, the size (Hout) of the opening provided downstream of the first stage turbine nozzle 321 in the radial direction is the aerodynamically determined size, and the outer wall (outer shroud 352) of the first stage turbine nozzle 321 in the radial direction is obliquely arranged with respect to the axial center R of the rotor (4) towards the outer end D of the transition piece outlet 222 in the radial direction, so that the size (Hin) between upstream ends of the inner shroud 351 and the outer shroud 352 in the radial direction has a same dimension as the size (a) of the transition piece outlet 222 in the radial direction.

As shown in FIG. 10, the first virtual straight line 223 and the second virtual straight line 224 are then connected. Specifically, the cylinder-shaped portion from the transition piece inlet 221 is maximized, and a circular arc R1 that comes into contact with the first virtual straight line 223 and the second virtual straight line 224, and has a radius as large as possible is set, so that the inner rim of the transition piece 22 in the radial direction does not expand inward. Accordingly, the inner end A of the transition piece inlet 221 in the radial direction and the inner end C of the transition piece outlet 222 in the radial direction are connected with the first virtual straight line 223, the second virtual straight line 224, and the circular arc R1, thereby determining an inner outline of the transition piece 22 in the radial direction. An inner end E in the radial direction and an outer end F in the radial direction of the cylinder-shaped portion of the transition piece 22 provided downstream are also determined.

As shown in FIG. 11, the outer end F of the cylinder-shaped portion in the radial direction and the outer end D of the transition piece outlet 222 in the radial direction are then connected. Specifically, a straight line extended from the outer end B in the radial direction to the outer end F in the radial direction of the transition piece inlet 221, and the oblique outer wall (outer shroud 352) of the first stage turbine nozzle 321 in the radial direction that extends to the outer end D in the radial direction are smoothly connected by two circular arcs, or by two circular arcs and a straight line. In other words, at the outer end F in the radial direction, a circular arc R2 which contacts tangentially with a straight line extended from the outer end B in the radial direction to the outer end F in the radial direction, is provided from the outer end F in the radial direction to a point G. A straight line 225 connected to the circular arc R2 is extended from the point G towards the downstream. A straight line 226 of the oblique outer wall (outer shroud 352) of the first stage turbine nozzle 321 in the radial direction is extended from the outer end D in the radial direction towards the downstream. A circular arc R3 that connects a point H of the straight line 225 and a point J of the straight line 256 is also set. Accordingly, the outer end F of the cylinder-shaped portion in the radial direction and the outer end D of the transition piece outlet 222 in the radial direction are smoothly connected, thereby determining the outer outline of the transition piece 22 in the radial direction.

Finally, the shape from the transition piece inlet 221 to the inner end E in the radial direction and the outer end F in the radial direction is formed in a cylinder shape, and the cross-sectional area of the cylinder-shaped portion is monotonously reduced to the inner end C in the radial direction and the outer end D in the radial direction of the transition piece outlet 222, based on the inner outline in the radial direction and the outer outline in the radial direction.

To manufacture the transition piece 22, for example, the cylinder-shaped portion may be divided into four in the axial direction. The transition piece 22 is formed by pressing the divided cylinder-shaped portions, and connecting them by welding.

In the transition piece 22 of the combustor 2, as shown in FIG. 12, when the flow velocity around the inner wall surface of the outer outline in the radial direction and the inner outline in the radial direction is viewed, in the transition piece 22 (shown by the solid line) of the present embodiment, the flow velocity from the transition piece inlet 221 to the transition piece outlet 222 reaches a maximum at the transition piece outlet 222. Before this, the flow velocity is monotonously and stably increased corresponding to the contraction ratio while the flow velocity is being suppressed, so as not to exceed the maximum value. Alternatively, in a comparison example (shown by the broken line) in which the cross-sectional area is not monotonously reduced, the flow velocity from the transition piece inlet 221 to the transition piece outlet 222 is fast, and changed unstably. Accordingly, the flow velocity reaches the maximum before reaching the transition piece outlet 222.

In this manner, in the combustor transition piece and the gas turbine of the present embodiment, the change of the cross-sectional area from the transition piece inlet 221 to the transition piece outlet 222 is optimized. Accordingly, the flow velocity of the combustion gas at the wall surface is reduced, and the amount of heat exchange at the portion of the transition piece outlet 222 can be reduced. Consequently, it is possible to improve the combined efficiency. In the designing method of the combustor transition piece, it is possible to obtain an optimal shape of the transition piece 22 that can improve the combined efficiency.

INDUSTRIAL APPLICABILITY

In this manner, the combustor connection structure, the combustor transition piece, the designing method of a combustor transition piece, and the gas turbine according to the present invention are suitable for improving the combined efficiency.

EXPLANATIONS OF LETTERS OR NUMERALS 1 compressor
2 combustor
21 inner cylinder
22 transition piece
221 transition piece inlet
222 transition piece outlet
23 outer casing
24 combustor casing
251 pilot nozzle
252 main nozzle
252b burner tube
3 turbine
31 turbine casing
32 turbine nozzle
321 first stage turbine nozzle
322 blade portion
33 turbine rotor blade
351 inner shroud
352 outer shroud
4 rotor
Din cross-sectional area of the transition piece inlet
Dout cross-sectional area of the transition piece outlet
Dout/Din contraction ratio
Hin size between upstream ends of the inner shroud and the outer shroud in the radial direction (blade height at the upstream)
Hout size of an opening provided downstream of the first stage turbine nozzle in the radial direction (blade height at the downstream)
Hin/Hout ratio of the sizes in the radial direction (blade height ratio)
R axial center of a rotor
S center line of the combustor

The invention claimed is:

1. A designing method of a combustor transition piece comprising:
setting an angle of a center line of a combustor relative to an axial center of a rotor of a gas turbine;
setting a contraction ratio from a transition piece inlet in which combustion gas flows to a transition piece outlet from which the combustion gas flows out;
forming an inner outline in a radial direction, by extending a first straight line in parallel with the center line from an inner end in a radial direction of the transition piece inlet to a downstream side, while maintaining a cross-sectional area of the transition piece inlet, extending a second straight line in parallel with the axial center from an inner end in a radial direction of the transition piece outlet to an upstream side, and connecting the first and second straight lines by an arc;
forming an outer outline in the radial direction by smoothly connecting an outer end in a radial direction on a tubular downstream side where the cross-sectional area of the transition piece inlet is maintained, to an outer end in the radial direction of the transition piece outlet; and
monotonously reducing a cross-sectional area from the tubular downstream side to the transition piece outlet, along the inner outline in the radial direction and the outer outline in the radial direction.

2. The designing method of a combustor transition piece according to claim 1, further comprising:
setting a cross-sectional area Dout of the combustor transition piece outlet within a range of 0.79<Dout/Din<0.9, relative to a cross-sectional area Din of the combustor transition piece inlet.

3. The designing method of a combustor transition piece according to claim 1, further comprising;
dividing a cylinder-shaped portion into four in an axial direction; and
forming the combustor transition piece by pressing the divided cylinder-shaped portions and connecting them by welding.

4. The designing method of a combustor transition piece according to claim 2, further comprising:
dividing a cylinder-shaped portion into four in an axial direction; and
forming the combustor transition piece by pressing the divided cylinder-shaped portions and connecting them by welding.

5. A device, comprising:
a combustor transition piece designed by executing the method claim 1.

6. A device, comprising:
a combustor transition piece designed by executing the method claim 2.

7. A device, comprising:
a combustor transition piece designed by executing the method claim 3.

* * * * *